United States Patent [19]

Schuster

[11] 3,998,323
[45] * Dec. 21, 1976

[54] CONVEYING APPARATUS FOR HEAT TREATMENT FURNACES

[75] Inventor: Rolf Schuster, Hanau, Germany

[73] Assignee: Deutsche Gold-und Silber-Scheidean-stalt Vormals Roessler, Frankfurt, Germany

[ * ] Notice: The portion of the term of this patent subsequent to Sept. 16, 1992, has been disclaimed.

[22] Filed: Aug. 29, 1975

[21] Appl. No.: 609,156

Related U.S. Application Data

[63] Continuation of Ser. No. 417,598, Nov. 20, 1973, Pat. No. 3,905,472.

[30] Foreign Application Priority Data

Dec. 4, 1972  Germany ................. 2259300

[52] U.S. Cl. ............................................. 198/835
[51] Int. Cl.² .................................... B65G 23/00
[58] Field of Search .................. 198/203, 127 R; 104/166, 168; 38/143

[56] References Cited

UNITED STATES PATENTS

| 2,733,801 | 2/1956 | Dryg .................. 198/127 R |
| 3,464,131 | 9/1969 | McCabe ...................... 38/143 |
| 3,905,472 | 9/1975 | Schuster ..................... 198/203 |

*Primary Examiner*—Evon C. Blunk
*Assistant Examiner*—Joseph E. Valenza
*Attorney, Agent, or Firm*—Cushman, Darby & Cushman

[57] ABSTRACT

There is provided a conveying apparatus for the transport of conveyor belts, straps made of wire links, or conveying boxes in a heat treatment furnace in which the driving force to the articles conveyed takes place through two or more rolls rotating at the same speed in opposite directions, the rolls lie in a horizontal plane, are arranged in an acute angle to the conveying direction and form an acute angle with each other, and a single endless flexible belt encircles both of the rolls.

3 Claims, 2 Drawing Figures

CONVEYING APPARATUS FOR HEAT TREATMENT FURNACES

This is a continuation of application Ser. No. 417,598, filed Nov. 20, 1973, now U.S. Pat. No. 3,905,472.

BACKGROUND AND SUMMARY OF THE INVENTION

This invention relates to conveying apparatus for heat treatment furnaces in the case of which the material that is to be treated is transported by means of conveyor belts, straps made of wire links or conveying boxes.

Known supports of conveyor belts or wire links are made in such a way that an endless belt is driven by a roller on the one side and is reversed by a roller on the other side.

Such an arrangement has the disadvantage that the conveyor belts or the straps of wire links are subjected to a great tension load. Since in the case of higher temperatures, the strength of the material drops very considerably, it is extremely important to keep the tension load of the belt small, in order to achieve a sufficient useful life for the belt.

Another known belt driving arrangement attempts to eliminate the above-mentioned disadvantage. In this apparatus, the conveyor belt rests on a moveable plate. This plate is moved forward and backward, whereby the belt is driven in the forward movement and during the backward stroke, the plate is pulled away from under the belt.

As a result of that, tension on the belt during the feed is avoided, during the backward thrust, when the plate is withdrawn from under the belt, such a tension on the belt cannot be avoided.

For the furnace transportation of boxes or shuttles, pushing through or driving is used as a known process. The disadvantage in the case of this process is quite obvious. The pushing forces required for the individual boxes are additive, so that by summation considerable force must be exerted on the boxes, which might result in the case of higher temperature in the deformation of boxes.

The present invention makes it possible to avoid the main disadvantage of the known conveying apparatuses, namely the high mechanical stress on the conveying belts or boxes. This object is achieved by the fact that the propelling force is made uniformly effective along the entire furnace and does not, as in the case of the conveyor belt, only act locally by the driving roll or in the case of pushing through furnaces by locally concentrated pushing.

The problem on which the invention is based is to distribute the driving force uniformly over the conveying path and the objects or articles to be conveyed, such as conveyor belts, straps of wire links, boxes, shuttles, plates or jointed bands subdivided into individual boxes.

According to the invention, this problem is solved by imparting the driving force to the articles that are to be conveyed by two or more rolls disposed with their longitudinal axes at an acute angle in relation to the direction of transportation, which rolls move at the same speed of rotation, but in an opposite rotational direction. The rolls can be developed solid or hollow and they have their longitudinal axes slightly inclined in the direction of conveyance. However, the longitudinal axes of the rolls always lie in one plane. A single endless flexible means encircles both of the rolls.

BRIEF DESCRIPTION OF THE DRAWINGS

The invention will be understood best in connection with the drawings, wherein.

DETAILED DESCRIPTION OF THE INVENTION

Figure 1:
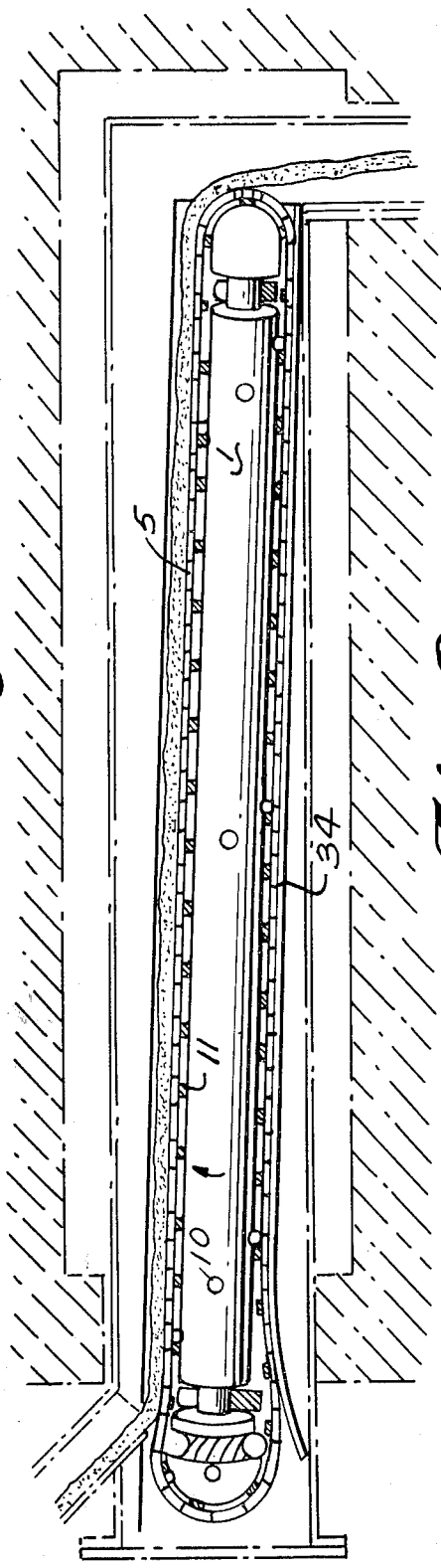
FIG. 1 is a longitudinal sectional view of one form of apparatus according to the invention taken along the line 1—1 of FIG. 2.
Figure 2:
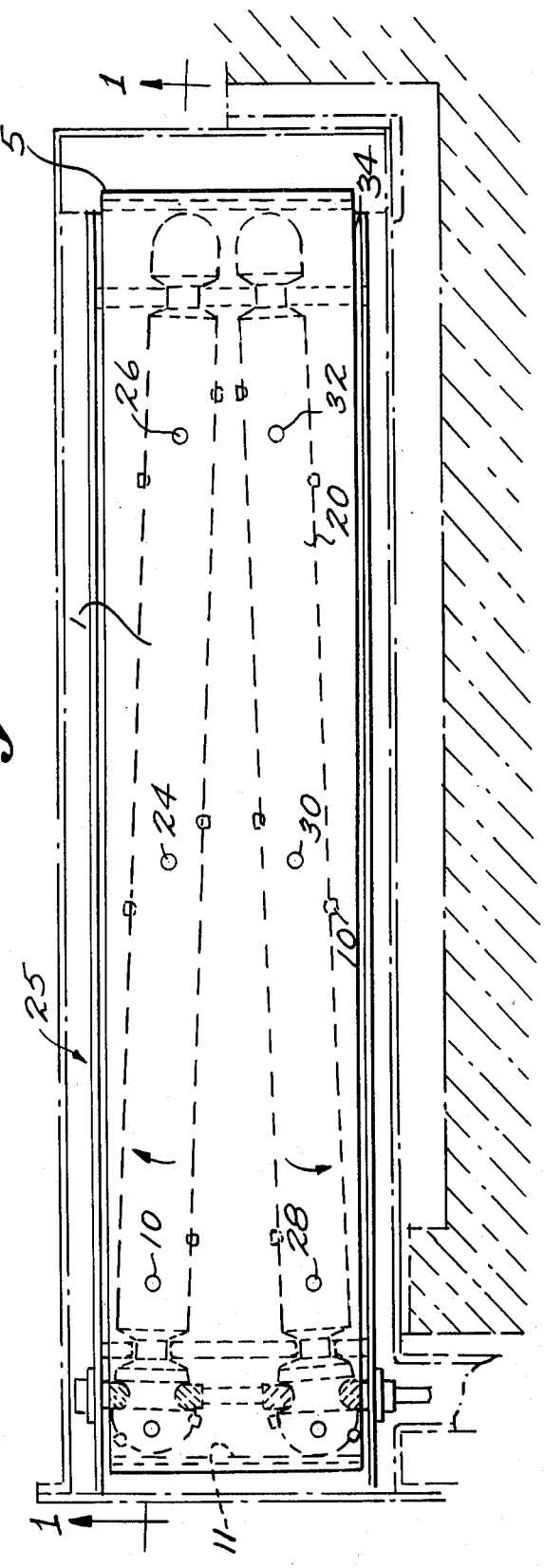
FIG. 2 is a top plan view of the apparatus of FIG. 1.

Referring more specifically to FIGS. 1, 2 and 3, they illustrate the basic idea of the invention.

The core of the invention are the two rolls or tubes 1 and 20 in the furnace indicated generically at 25. The rolls extend in the direction of transportation. In the following description they are referred to merely as rolls. The rolls 1 and 20 resting in the bearings 2 and 22 run somewhat transversely in relation to the direction of transportation and as a result of that together form an acute angle in the range of magnitude of 1° to 15°. In the embodiment shown in FIG. 2, the acute angle is approximately 4½°. The rolls 1 and 20 are put into rotation by way of oppositely pitched worm gears 3 driven in the same direction by a motor 4, whereby the rotational direction of the rolls 1 and 20 are in opposing directions, the number of revolutions for both however is the same. Naturally, the driving force can also be accomplished in some other manner, thus for example, by means of chains or V-belts, etc.

According to another embodiment of the invention, especially in the case of a wider conveying path, several pairs of rolls can be arranged. Normally an even number of rolls, e.g. 2, 4, 6 or 8, are employed to insure that there is no component of force in an undesired direction. Also in the case of a greater length, an intermediate mounting by two additional bearings 2 and 22 is possible.

As shown in the drawings, an endless conveyor strap assembly 5 encircles the rolls 1 and 20. The returning flight of the endless conveyor strap assembly 5 is pressed from below against the rolls, as by the bight portion of a U-shaped trough structure 34. In this way, a uniform drive is also exerted on the belt in the return direction for the purpose of supplementing the driving action and thus increasing the conveying capacity. The conveying arrangement, as shown in FIG. 1, can be mounted slightly inclined in the direction of conveyance.

If the conveyor belt is equipped with transverse strips 11 and the rolls with pins, such as pins 10, 24, 26, 28, 30 and 32, as is shown by way of example in FIGS. 1 and 2, then one will achieve a positive conveyance of the belt.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Conveying apparatus for conveyance of conveyer belts, wire link straps, conveyer boxes or the like in a heat treatment furnace, comprising a pair of similar cylindrical rollers defining a single conveying path, means mountng said rollers in generally longitudinally coextensive relation for rotation about axes disposed within a generally horizontal plane in converging relationship with respect to one another in the direction of the conveying path at an acute angle in the range of magnitude of 1° to 15°, the axes of rotation of each roller being coexistent with the axis of the cylindrical form thereof, means for simultaneously rotating said rollers about their axes of rotation in opposite directions so that their upper peripheries move with lateral components of movement which are equal and in opposite directions and longitudinal components of movement which are both in the same direction, and a single endless flexible means encircling both of said rollers including an upper flight engaging the upper periphery of said rollers and a return flight below said rollers.

2. Conveying apparatus as defined in claim 1 wherein the plane of the axes of rotation has a slight inclination in the direction of conveyance.

3. Conveying apparatus as defined in claim 1 wherein said endless flexible means includes a plurality of parallel transverse straps facing said rollers and a plurality of driving members extending outwardly from the periphery of said rollers for engaging said straps during the rotation of said rollers.

* * * * *